(No Model.) 2 Sheets—Sheet 1.
W. R. MACDONALD.
GENERATOR.
No. 488,824. Patented Dec. 27, 1892.
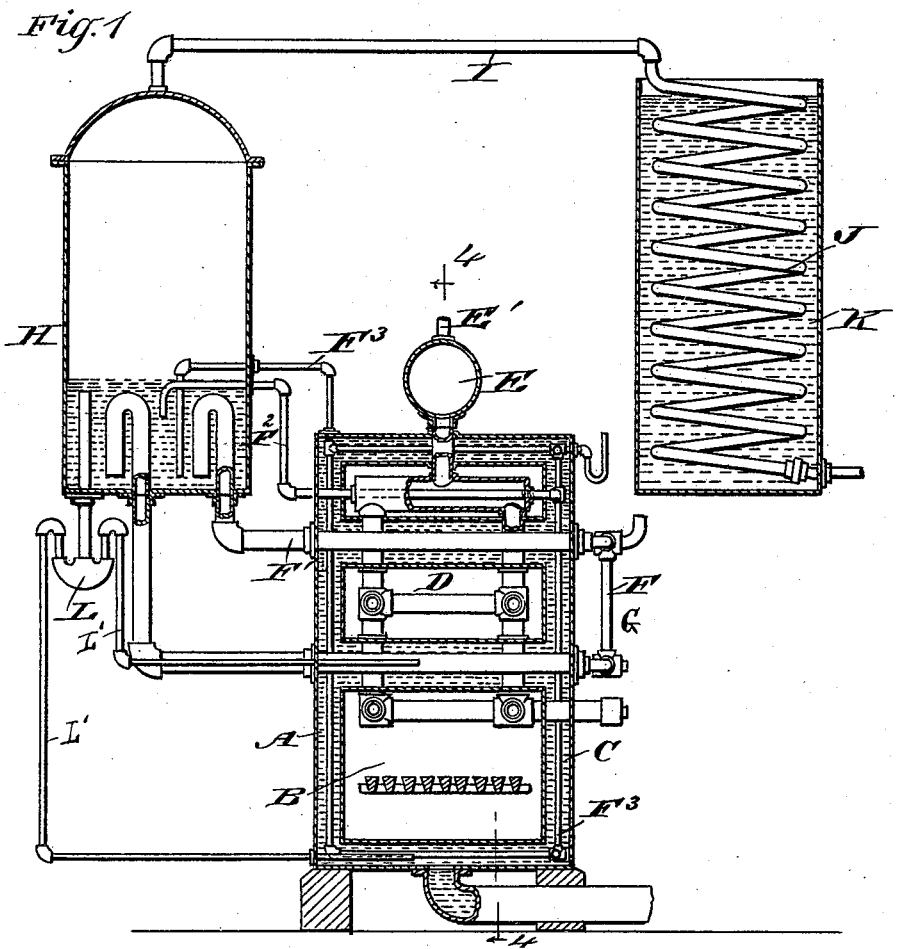
WITNESSES:
J. O. Criswell
C. Sedgwick
INVENTOR:
W. R. Macdonald
BY Munn & Co.
ATTORNEYS

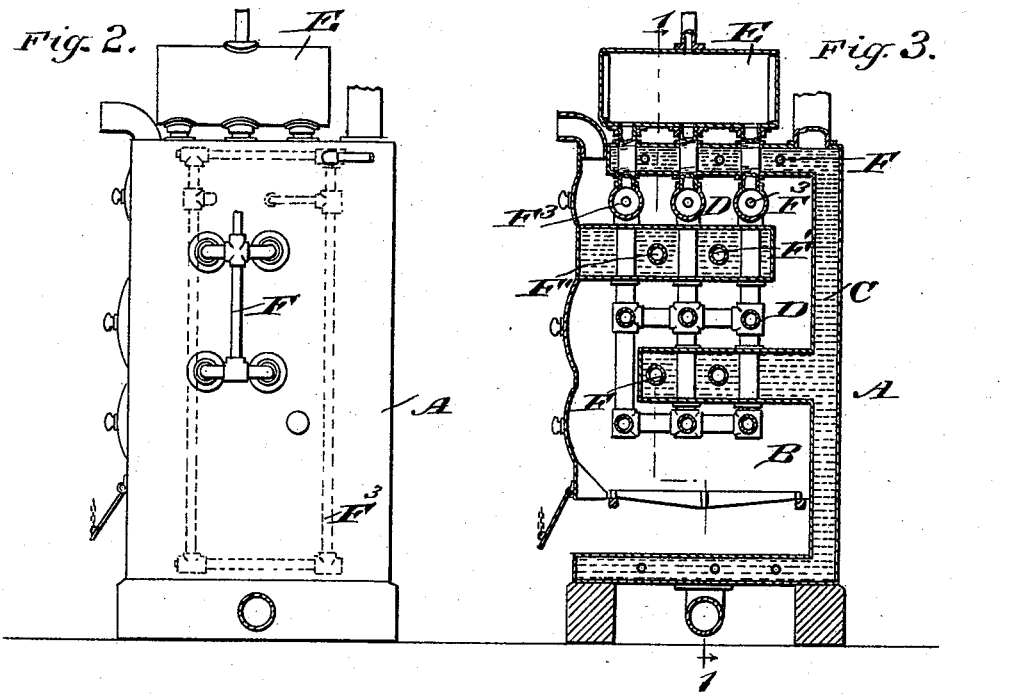

UNITED STATES PATENT OFFICE.

WILLIAM R. MACDONALD, OF ALLEGHENY, PENNSYLVANIA.

GENERATOR.

SPECIFICATION forming part of Letters Patent No. 488,824, dated December 27, 1892.

Application filed December 21, 1891. Serial No. 415,774. (No model.)

*To all whom it may concern:*

Be it known that I, WILLIAM R. MACDONALD, of Allegheny, in the county of Allegheny and State of Pennsylvania, have invented a new and Improved Generator, of which the following is a full, clear, and exact description.

The invention relates to systems of heating and refrigerating apartments and purifying the incoming air.

The object of the invention is to provide a new and improved generator which is simple and durable in construction, very effective in operation, and designed to comfortably heat and cool and supply fresh air to apartments.

The invention consists principally of a hot water heater, a steam heater located therein and heated therefrom, and a gas generator located in the said hot water heater and also heated therefrom.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a sectional front elevation of the apparatus on the line 1—1 of Fig. 4; Fig. 2 is a side elevation of the generator; Fig. 3 is a transverse section of the same on the line 3 3 of Fig. 1.

The improved generator is provided with a hot water heater A, of any approved construction, and provided with the usual fire box B and the water circulating tubes or compartments C.

In the hot water heater A is located a steam generator D, preferably made in tubular form, and subjected to the heat generated in the fire box B of the hot water heater A. The upper end of the steam generator D, is provided with a drum E arranged outside of the hot water heater A, and connected by a suitable pipe E' with radiators for heating the apartment or apartments of the building. The hot water heater A, is also provided with the usual outlet pipes passing to suitable radiators located in the building.

In the hot water heater A is also arranged an ammonia gas generator for producing a cooling mixture to cool the building, the said ammonia generator being heated from the fire box B of the hot water heater A. As illustrated in the drawings, a series of pipes F form the ammonia generator G at one side of the heater A, and from the same extend the pipes F' passing horizontally through the water tubes C of the heater A to connect with a discharge in a separator H. In a like manner pipes $F^2$ and $F^3$ of the ammonia generator may be respectively arranged horizontally and vertically in the water compartment of the hot water heater A, as is shown in the drawings.

The separator H is provided with suitable overflow trap or traps L of any approved construction and from which lead the return pipes L' connected with and discharging into the hot water compartment of the hot water heater A. It will be seen that when the hot water heater A is fired up, the water therein it heated and can be used by the heating radiators in the building, and at the same time the steam generator D generates the steam which can be utilized for various purposes, heating, &c., and the ammonia generator is heated to produce the ammonia gas passed from the separator H through the pipe I into the coil J, located in the cooler K. The end of the coil J connects with the brine tank, (not shown.) The brine can be passed through suitable pipes or radiators in the building to cool the air passing over the said radiators.

It is understood that when the generator has been charged with the ammonia solution and the same has been heated, the gaseous product rises and passes through the pipes F, F', $F^2$, $F^3$, into the separator H in which the ammonia gas is separated from the moisture, passes into pipe I and to the cooler K, as above described. The weak solution is returned to the generator by the trap L and return pipes L' so that a continuous circulation of the liquid is kept up between the generator and the separator H.

The combined heater and generator is constructed of various sizes and dimensions, so that the number of water sections, or steam generator sections or ammonia gas generator sections, may be increased or decreased, and that in winter a portion of the ammonia gas generator sections, or all of them, may be withdrawn from the heater or generator and the entire capacity of the apparatus be utilized for heating purposes, while in summer the generation of ammonia gas and sufficient steam power to work fans and pumps would be the scope of the operation.

In hospital service and in emergencies, when it is necessary to supply cold air to one section of the building and warm air to another section, then it will be readily seen that with a generator of positive heat and a generator of negative heat (cold), the service is easily accomplished.

In regard to the use of refrigerants, I do not confine myself exclusively either to the brine system of circulation or to the direct expansion system, as either is equally applicable, although the brine system is preferred for the reason that the brine cooled during the day may be used during the night while the generators may not be required to work. In the direct expansion system a constant operation is required.

By the use of a heater, as herein described, and having an ammonia gas generator incorporated therewith, the same kind of supply and return pipes and disconnected coils or radiators may be used in winter for the transmission and delivery of heat by steam or water, and in summer used for conveyance and delivery of refrigerants, thus performing double duty from a single line of pipe.

To avoid a multiplicity of intermediate details incidental to the installation of heating plants and refrigerating plants, and which are necessary to the successful operation of said heating and refrigerating installations but not included in this specification or claims, such condensers evaporators, coolers, gages, expansion or other valves, pumps, &c., are omitted in the detail of specification, and the claims confined only to such matter as shown and claimed; the before mentioned articles necessary to the completion of the system, to be those in common use and of well known and approved construction.

Having thus described my invention, I claim as new, and desire to secure by Letters Patent:—

1. An apparatus of the class described, comprising a hot water heater, a steam generator located therein and heated from the same, and a gas generator arranged in the said hot water heater and deriving its heat from the same, substantially as shown and described.

2. In an apparatus of the class described, the combination with a heater having a fire box and water tubes and water compartments, of a steam generator arranged in the said water heater and heated from the said fire box, and an ammonia gas generator extending with its pipes into and through the said water tube compartments and steam generator to derive the necessary heat for producing the gas, substantially as shown and described.

3. In an apparatus of the class described, the combination with a hot water heater, of an ammonia gas generator provided with pipes extending into the water contained in the said hot water heater, the said pipes being heated thereby to generate gas for cooling purposes, substantially as shown and described.

WILLIAM R. MACDONALD.

Witnesses:
HARRY T. MACDONALD,
J. N. COOKE.